United States Patent
Liu et al.

(10) Patent No.: US 9,266,193 B2
(45) Date of Patent: Feb. 23, 2016

(54) INFINITE THICKNESS LASER PROCESSING SYSTEM

(71) Applicants: Henry J. Liu, Las Vegas, NV (US);
Andrew M. Boggeri, Las Vegas, NV (US)

(72) Inventors: Henry J. Liu, Las Vegas, NV (US);
Andrew M. Boggeri, Las Vegas, NV (US)

(73) Assignee: FULL SPECTRUM LASER LLC, Las Vegas, NV (US)

( * ) Notice: Subject to any disclaimer, the term of this patent is extended or adjusted under 35 U.S.C. 154(b) by 418 days.

(21) Appl. No.: 13/935,438

(22) Filed: Jul. 3, 2013

(65) Prior Publication Data
US 2014/0014634 A1    Jan. 16, 2014

Related U.S. Application Data

(60) Provisional application No. 61/671,382, filed on Jul. 13, 2012.

(51) Int. Cl.
| | |
|---|---|
| *G02B 7/02* | (2006.01) |
| *G02B 7/04* | (2006.01) |
| *B23K 26/06* | (2014.01) |
| *B23K 26/08* | (2014.01) |
| *B23K 26/36* | (2014.01) |

(52) U.S. Cl.
CPC ......... *B23K 26/0665* (2013.01); *B23K 26/0876* (2013.01); *B23K 26/362* (2013.01); *B23K 26/064* (2015.10); *G02B 7/02* (2013.01); *G02B 7/04* (2013.01)

(58) Field of Classification Search
CPC ............. G02B 7/02; G02B 7/04; B23K 26/06
USPC ........................ 347/256–258, 263; 250/492.1; 219/121.68; 359/425, 694, 702, 822, 359/823
See application file for complete search history.

(56) References Cited

U.S. PATENT DOCUMENTS

| | | | | |
|---|---|---|---|---|
| 4,352,973 A | * | 10/1982 | Chase | B23K 26/0093 219/121.68 |
| 4,459,458 A | * | 7/1984 | Vetsch | B23P 25/003 219/121.6 |
| 4,488,787 A | * | 12/1984 | Osawa | G02B 7/04 359/700 |

* cited by examiner

*Primary Examiner* — Samuel M Heinrich
(74) *Attorney, Agent, or Firm* — Riel Law; Jennifer Riel

(57) ABSTRACT

A laser material processing system comprises: a housing defining an engraving chamber, an xy laser beam steering system, and a non-telescoping sliding focus mechanism. The housing includes a removable bottom panel that allows processing of workpieces that exceed dimensions of the engraving chamber and allows stacking of the system on modular attachments for specialized functions. The focus mechanism includes a carriage mirror subassembly attached to the x-axis carriage, a sliding member moveably attached to the carriage mirror subassembly, and a focusing lens subassembly attached perpendicularly to the lower end of the sliding member. The carriage mirror subassembly and the focusing lens subassembly are configured to receive and focus a laser beam to a focal point. The focusing lens subassembly is adjusted along a z-axis by disengaging the locking component and vertically sliding the sliding member and is locked into a position by engaging the locking component with the sliding member.

21 Claims, 13 Drawing Sheets

INFINITE THICKNESS LASER PROCESSING SYSTEM

This application claims the benefit of priority under 35 U.S.C. §119 of provisional application Ser. No. 61/671,382, filed Jul. 13, 2012, the contents of which are hereby incorporated by reference.

FIELD OF THE INVENTION

The present invention relates generally to laser material processing systems. More particularly, the present invention relates to a modular laser material processing system apparatus and focusing mechanism for a laser beam for use in cutting and engraving materials of varying thicknesses and sizes with the capability to cut and engrave materials that exceed the limited dimensions of a work area.

BACKGROUND

Laser material processing systems or laser engraving machines are capable of directing a laser in a controlled pattern in order to etch and cut materials such as acrylic, or burn and mark materials such as wood or metal. They include a laser source, beam steering apparatus, beam focusing apparatus, a controller capable of directing the position of the laser output, and a surface or workspace into which objects can be placed for the laser engraving machine to act upon them.

The output from the laser produces heat energy at the point of focus. Depending on the power of the laser and the material being engraved, the laser's energy may vaporize portions of the material or cut completely through it. With other materials or at lower power settings, the top layer of the material may be burned or charred to produce patterns, images, or words. Common materials used in engraving are plastics, wood, leather, and some types of metal.

Laser material processing systems can be controlled by home or office computer systems in a similar method to traditional ink- and toner-based printers. Using various software and device drivers, laser material processing systems can be instructed to "print" patterns using a laser, including patterns such as images, text, or shapes. The controller positions the laser head at the appropriate x-axis and y-axis positions; some controllers are also able to control the distance between the laser and the material being engraved and thus adjust the z-axis (the engraving plane) as well. Thus, laser engraving machines can be used to cut shapes from a solid sheet of acrylic, to shape blocks of wood into jewelry, or to "print" by burning patterns onto wood or leather signs, belt buckles, or wallets.

Laser engraving machines can vary from very large, industrial machines with a large workspace (the size of which limits the size of the object that can be engraved), to home models of more limited dimensions and workspace capacities. These laser engraving machines are alternately known as laser cutters, and smaller units designed for homes or garages are commonly referred to as "hobby lasers."

Traditionally, the design of laser engraving machines includes a workspace that is enclosed to some degree. Within the workspace the output of the laser is controlled to move on x, y, and z axes. This design paradigm necessitates the size of the workspace—and hence the size of the object to be engraved—be limited by the overall size of the laser engraving machine itself. In order for the laser engraving machine to operate on an object to be engraved, that object would need to physically fit (in length, width, and height) within the confines of laser engraver. For example, a hobby laser engraving device might only be able to fit objects no more than 24 inches in length, 12 inches in width, and 6 inches deep; objects larger than these dimensions in any direction could not be engraved by a machine of such size. In the field of affordable, relatively compact, easy to ship "hobby lasers" for home use, such limitations meant that these systems could only be used for smaller projects and to engrave smaller objects.

It is standard practice within the industry to provide a method for varying the distance from the engraving plane to the focus optic in combination with a final turning mirror in order to allow a laser material processing system to process varying workpiece thicknesses. The methods used currently in the industry are either: (a) a focusing optic fixed in the vertical up-down direction (z-axis or z space) with an adjustable lower surface that moves the entire material vertically up or down in the z direction, or (b) a limited motion focusing optic in which the motion is constrained such that no part of the vertically moving mechanism can pass above the laser beam path.

The fixed focusing optic method that utilizes a lower surface that travels or moves vertically up and down (a "z table") is deficient due to the limited range of workpiece thicknesses that can be accommodated within the engraving chamber and remain in focus. The nature of a fixed optic and movable z table requires that the z table be actuated in some manner, leading to restrictions in the range of motion of the z table for a given work area envelope and laser material processing system size. This method requires raising the z table through motorized or manual turning of lead screws or belts. This creates problems due to the additional cost and complexity of the extra motorized or manual z table along with the cost and complexity to ensure the z table is perfectly flat, requiring the need for constant adjustments after transportation. Furthermore, the additional mechanical components required for actuating the entire z table often reduces the area that can be reached by the laser beam in the horizontal left-right direction (x-axis) and/or horizontal forward-backward direction (y-axis).

A limited motion focusing optic eliminates the disadvantages of the travelling z table design but suffers from limited focusing distance because no part of the vertically moving mechanism can pass above the laser beam path. One method for making the focusing optic movable involves a telescoping lens tube in which the lens is mounted to a tube of length A, and this tube slides inside another tube of length B. The problem with this design is that the stroke is limited to length A in cases where A is less than or equal to B; or the stroke is limited to length B in cases where B is less than or equal to A. For a given work cube depth z, the maximum material thickness is limited to the difference in distance between work cube depth z and the maximum stroke length. This design is also limited to a minimum material thickness if the bottom work surface is fixed.

Another method for creating a limited motion optic utilizes a sliding mirror that is still limited because, like with a telescopic lens tube, these methods place the vertical moving/focus mechanism in-line with the final beam-steering mirror leading to limitations in vertical motion such that no part of the sliding mechanism can pass above the laser beam path.

Due to the widespread application and the growth of low-power laser material processing systems for use by small businesses, individual hobbyists, and other non-industrial users, there is a need and demand for a transportable, versatile, and affordable laser engraving system that is able to perform the same functions and engrave materials of the same sizes as larger, more expensive systems. Many laser engraving machines are comprised of cumbersome, monolithic housings, yet still provide only limited functionality and versatility. For instance, some laser processing systems are made of heavy sheet metal that is manipulated into a solid volume shape such as a box or cube; the larger the box, the larger the size of the material that can be engraved. These laser engraving systems are not only difficult and expensive to ship and transport due to their weight and large footprints, but manufacturing and assembly costs are high for such solid volumes. Also, without major modification to the main laser engraving system, such systems are not easily versatile or modular, so as to allow a part to easily be interchanged and/or an attachment to easily be added to allow customized performance of the laser material processing system for particular use applications, including use on certain types of materials, and/or specific shaped materials such as a cylindrical bottle.

Accordingly, there is a need in the art for a modular, versatile, interchangeable, and easily transportable laser processing system that: (a) includes a focusing mechanism that can effectively vary the distance from the engraving plane to the focus optic to allow the processing of varying workpiece thicknesses; (b) allows the processing of materials and workpieces that exceed the dimensions of the processing system's engraving chamber and work area (including in the z-axis); and (c) allows the user to add a variety of specialized modular attachments to perform specialized functions or to process specific types and/or shapes of materials and allows the user to easily interchange parts of the invention for increased functionality and capabilities. A laser processing system that addresses the above-mentioned drawbacks in the art would not only provide a consumer with a wide array of options for materials and workpieces to be processed, but it would be more cost-efficient since (i) a separate laser processing system apparatus would not have to be purchased to cut and engrave specific types or shapes of materials and materials that exceed workspace dimensions, and (ii) the costs for two-dimensional manufacturing and assembly of parts using flat panels would cost less than the three-dimensional manufacturing and assembly of parts for solid, monolithic volume structures of other laser processing systems. Other advantages of the present invention will be apparent to one of ordinary skill in the art in light of the ensuing description of the present invention.

SUMMARY

The present invention is directed to an affordable modular laser material processing system that includes interchangeable parts, configurable attachments, and a sliding focus mechanism that permit the cutting and engraving of various materials that exceed the dimensions of the engraving chamber.

The present invention overcomes the limitations of current laser processing systems by attaching the focusing optic to a sliding mechanism such that part of the sliding mechanism can pass above the laser beam path. The present invention allows the same focus lens travel in a more compact form factor and takes advantage of wasted z space above the horizontal left-right and forward-backward (x/y) beam steering system to gain greater maximum workpiece thickness for a given housing size. To take full advantage of the stroke length possible with the present invention, in some embodiments of the invention, the housing includes a removable bottom panel, and the sliding mechanism is dimensioned such as to make engraving or cutting workpieces below the normal work area possible. In such versions of the invention, the infinite thickness (z-axis) laser processing system can be mounted on a workpiece with dimensions that exceed the work area within the work cube in order to cut or engrave a portion of the workpiece corresponding to the normal range of x and y travel. By moving the entire laser engraving system in the x and y directions and engraving another section of the workpiece, and in conjunction with the infinite thickness (z-axis) of the workpiece, such a system can be used to engrave cars, tables, or other workpieces of virtually unlimited size in all three dimensions or axes.

The modular components and attachments and the interchangeable parts of the invention allow the performance of the laser material processing system to be customized to particular use cases or to be used with specific shapes and types of materials and workpieces. For instance, in embodiments of the invention wherein the housing includes a removable bottom panel, the laser processing system can be stacked on top of various attachments to enhance system capabilities and functionality such as part pass-through, automatic conveyor, part processing, and engraving on cylindrical surfaces. The laser material processing system of the present invention is adapted to function with various attachments to enhance its suitability for typical uses without major modification of the base system. Furthermore, the external housing of the laser processing system of the present invention is comprised of a panelized structure that costs less to manufacture, is easily transportable, can easily be disengaged wherein the bottom panel can be removed, and offers a small footprint so that the laser processing system can be placed onto any desktop, table, or other work surface.

To achieve the foregoing and in accordance with the purposes of the present invention, one aspect of the present invention is directed to a laser processing system that generally comprises: (a) a housing defining an engraving chamber, (b) an xy laser beam steering system located inside the engraving chamber, and (c) a non-telescoping focus mechanism. The xy laser beam steering system includes: (i) a first y-axis rail, (ii) a second y-axis rail parallel to the first y-axis rail, (iii) a first y-axis carriage moveably mounted to the first y-axis rail, (iv) a second y-axis carriage moveably mounted to the second x-axis rail, (v) an x-axis rail perpendicular to both the first y-axis rail and the second y-axis rail wherein one end of the x-axis rail is adjoined to the first y-axis carriage and the other end of the x-axis rail is adjoined to the second y-axis carriage, and (vi) an x-axis carriage moveably mounted to the x-axis rail. The non-telescoping focus mechanism comprises: (i) a carriage mirror subassembly attached to the x-axis carriage, (ii) a sliding member including a linear guide component and a locking component wherein the sliding member is moveably attached to the carriage mirror subassembly, and (iii) a focusing lens subassembly attached to a lower end of the sliding member. The carriage mirror subassembly and the focusing lens subassembly are configured to receive and focus a laser beam to a focal point. The focusing lens subassembly is adjusted along a z-axis of the engraving chamber by disengaging the locking component and vertically sliding the sliding member.

The linear guide component of the sliding member may include one or more slots, pins, screws and/or rails or any another suitable mechanism that linearly guides the sliding member's vertical motion and helps secure the sliding member into position. For example, in one embodiment of the invention, the sliding member is comprised of a flat plate and the linear guiding component is comprised of a first slot, a second slot, and a center slot wherein the first slot and second slot slide over locating pins to guide the sliding member, and the locking component is engaged with the center slot to hold the focusing lens subassembly at a position along the z-axis. The focusing lens subassembly includes a lens holder that is interchangeable to allow for different focal length lenses. The x-axis carriage comprises a plurality of rollers that move the x-axis carriage along the x-axis rail. The plurality of rollers comprises (i) a first fixed roller, (ii) a second fixed roller, (iii) a first eccentric roller, and (iv) a second eccentric roller wherein the first eccentric roller and the second eccentric roller can each be adjusted to align the x-axis carriage along the x-axis rail.

The housing may be comprised of (i) a left side panel, (ii) a right side panel, (iii) a front panel, (iv) a bottom panel, (v) a top member, and (vi) a back panel. The left side panel, the right side panel, the front panel, the bottom panel, the top member, and the back panel are configured to form the engraving chamber defined by the housing wherein the bottom panel is removable. When the bottom panel is removed, the laser processing system can be placed onto a workpiece that is larger than the engraving chamber. The laser processing system may further comprise one or more modular attachments for a specialized function wherein the laser processing system is stacked onto the modular attachment when the bottom panel is removed. For example, the laser processing system may further include a rotary attachment for engraving cylindrical surfaces. In other examples, the laser processing system may further include an automatic conveyor attachment, an automatic material handling stack attachment, and/or various subfloors configured for specialized applications and materials.

In an additional embodiment of the present invention, a non-telescoping focus mechanism for a laser processing system comprises: (a) a carriage mirror subassembly including (i) a carriage mirror and a carriage mirror mount wherein the carriage mirror subassembly is attached to a linear carriage of the laser processing system; (b) a sliding member that is moveably engaged with the linear carriage and includes (i) a linear guiding component (ii) a locking component; and (c) a focusing lens subassembly that is attached to a lower end of the sliding member and includes (i) a lens holder and (ii) a focus lens. The carriage mirror and the focus lens are configured to receive and focus a laser beam to a focal point. The focusing lens subassembly is adjusted to a vertical position by vertically sliding the sliding member and the focusing lens subassembly is locked into the vertical position by engaging the locking component with the sliding member. In an embodiment of the present invention, the linear carriage (to which the carriage mirror subassembly is attached) is the x-axis carriage of the laser processing system. In one version of the invention, the sliding member is a flat plate, the linear guiding component is comprised of at least one slot, and the locking component is a locking screw that engages with the sliding member by inserting the locking screw into the at least one slot. In some versions of this embodiment, the laser processing system includes a housing comprising a removable bottom panel.

In one embodiment of the invention, the sliding member is cylindrical, and the linear guiding component is comprised of (i) a first slot that allows the laser beam to enter the sliding member and to reflect off the carriage mirror, (ii) a second slot that provides clearance for the carriage mirror mount, and (iii) a third slot that provides clearance for the locking component. In another embodiment of the invention, the sliding member is a linear member comprising (i) a linear stage moveably mounted to the x-axis carriage and (ii) a linear member housing that surrounds the linear stage. Yet, in another embodiment of the invention, the sliding member includes a linear stage and a linear guiding component including one or more cylindrical motion guides, such as screws or rails, wherein the linear stage is guided along the vertical axis and is connected operatively to the focusing lens subassembly. In a further embodiment, the sliding member includes a motorized mechanism to automatically adjust the vertical position of the sliding member to thereby adjust the position of the focusing lens subassembly. For instance, the sliding member may include a powered vertical stage controlled by the engraving machine motion controller.

In a further embodiment of the present invention, a non-telescoping focus mechanism for a laser processing system comprises: (a) a carriage mirror subassembly including (i) a first lateral side attached to an x-axis carriage of the laser processing system and (ii) a second lateral side opposite the first lateral side wherein the second lateral side includes a lock aperture; (b) a sliding plate that is moveably attached to the second lateral side of the carriage mirror subassembly and includes (i) a locking component and (ii) a linear guiding component; and (c) a focusing lens subassembly attached perpendicularly to a lower end of the sliding plate wherein the carriage mirror subassembly and the focusing lens subassembly are configured to receive and focus a laser beam to a focal point. The focusing lens subassembly is adjusted to a vertical position by vertically sliding the sliding plate, and the focusing lens subassembly is locked into the vertical position by inserting the locking component into the lock aperture. The locking component may be comprised of a locking screw or any suitable locking mechanism known in the art. Also, the sliding plate is interchangeable with an alternate-length sliding plate (e.g., longer sliding plate).

In one embodiment of the invention, the linear guiding component comprises a center slot that runs longitudinally along the sliding plate wherein the locking component is moveably engaged with the center slot. In another embodiment, the linear guiding component further includes a first slot and a second slot that run parallel to the center slot wherein the center slot is positioned between the first slot and the second slot. The non-telescoping focus mechanism may further include a first locating pin and a second locating pin wherein the first locating pin and the second locating pin are attached to the second lateral side of the carriage mirror subassembly. The first slot slides over the first locating pin and the second slot slides over the second locating pin to maintain the focusing lens subassembly parallel to an engraving plane. In some versions of this embodiment, the laser processing system includes a housing comprising a removable bottom panel.

The above description sets forth a summary of embodiments of the present invention so that the detailed description that follows may be better understood and contributions of the present invention to the art may be better appreciated. Some of the embodiments of the present invention may not include all of the features or characteristics listed in the above summary. There may be, of course, other features of the invention that will be described below and may form the subject matter of claims. In this respect, before explaining at least one embodiment of the invention in further detail, it is to be understood that the invention is not limited in its application to the details of the construction and to the arrangement of the components set forth in the following description or as illustrated in the drawings. The invention is capable of other embodiments and of being practiced and carried out in various ways. Furthermore, it is to be understood that the phraseology and terminology employed herein are for the purpose of description and should not be regarded as limiting.

Other features, aspects, and advantages of the present invention will become apparent from the following description of the invention, taken in conjunction with the accompa-

DESCRIPTION OF THE INVENTION

In the following description of embodiments of the invention, reference is made to the accompanying drawings, which form a part of this application. The drawings show, by way of illustration, certain embodiments in which the invention may be practiced. It is to be understood that other embodiments may be utilized and modifications may be made without departing from the scope of the present invention. Also, it is to be understood that the phraseology and terminology employed herein are for the purpose of description and should not be regarded as limiting.

For ease of reference, the following reference numbers are consistently used in the accompanying drawings of the present application to depict various components and embodiments of the present invention.

Figure 1:
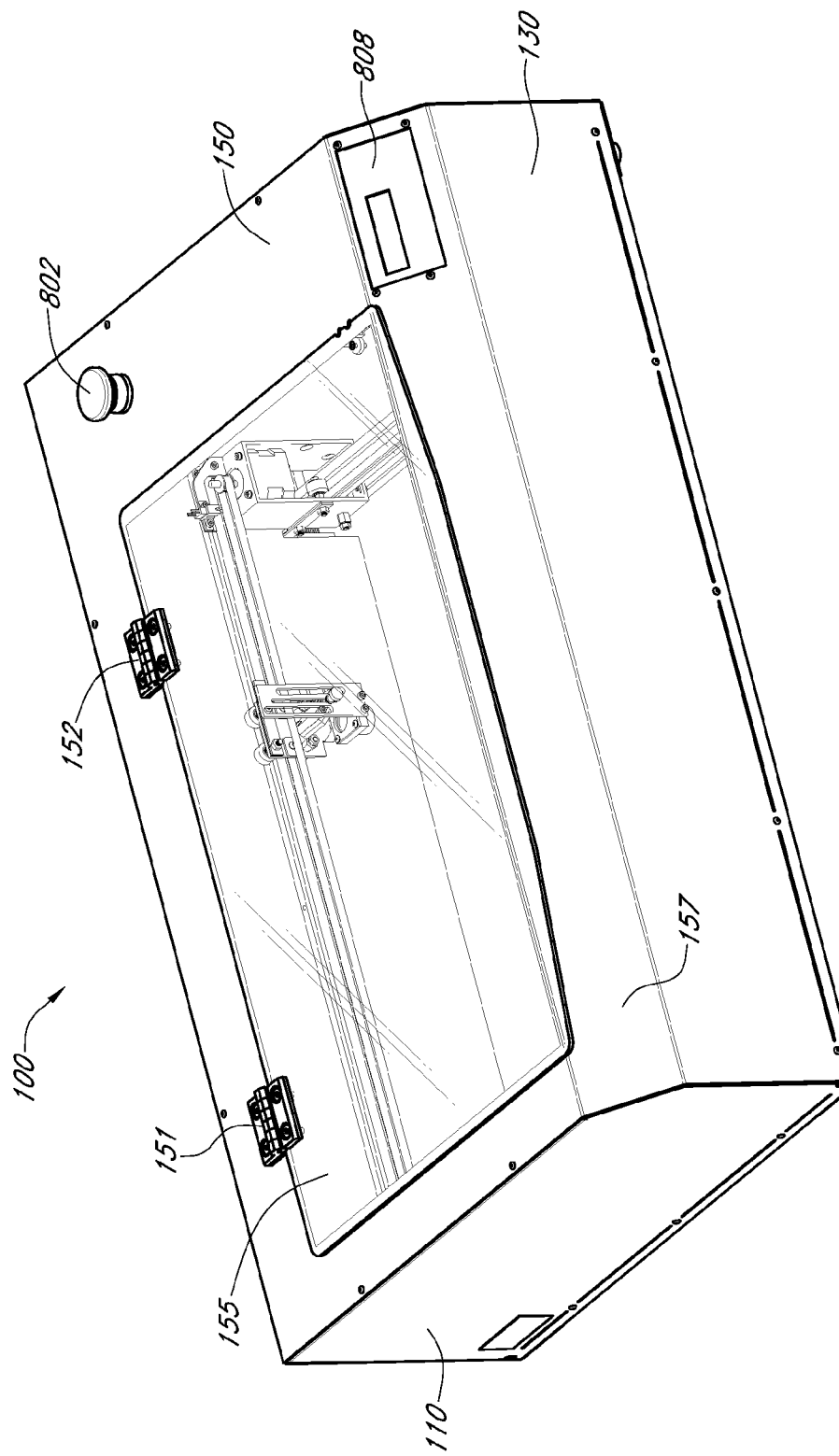
FIG. 1 depicts a perspective view of a laser processing system in accordance with an embodiment of the present invention.
Figure 2:
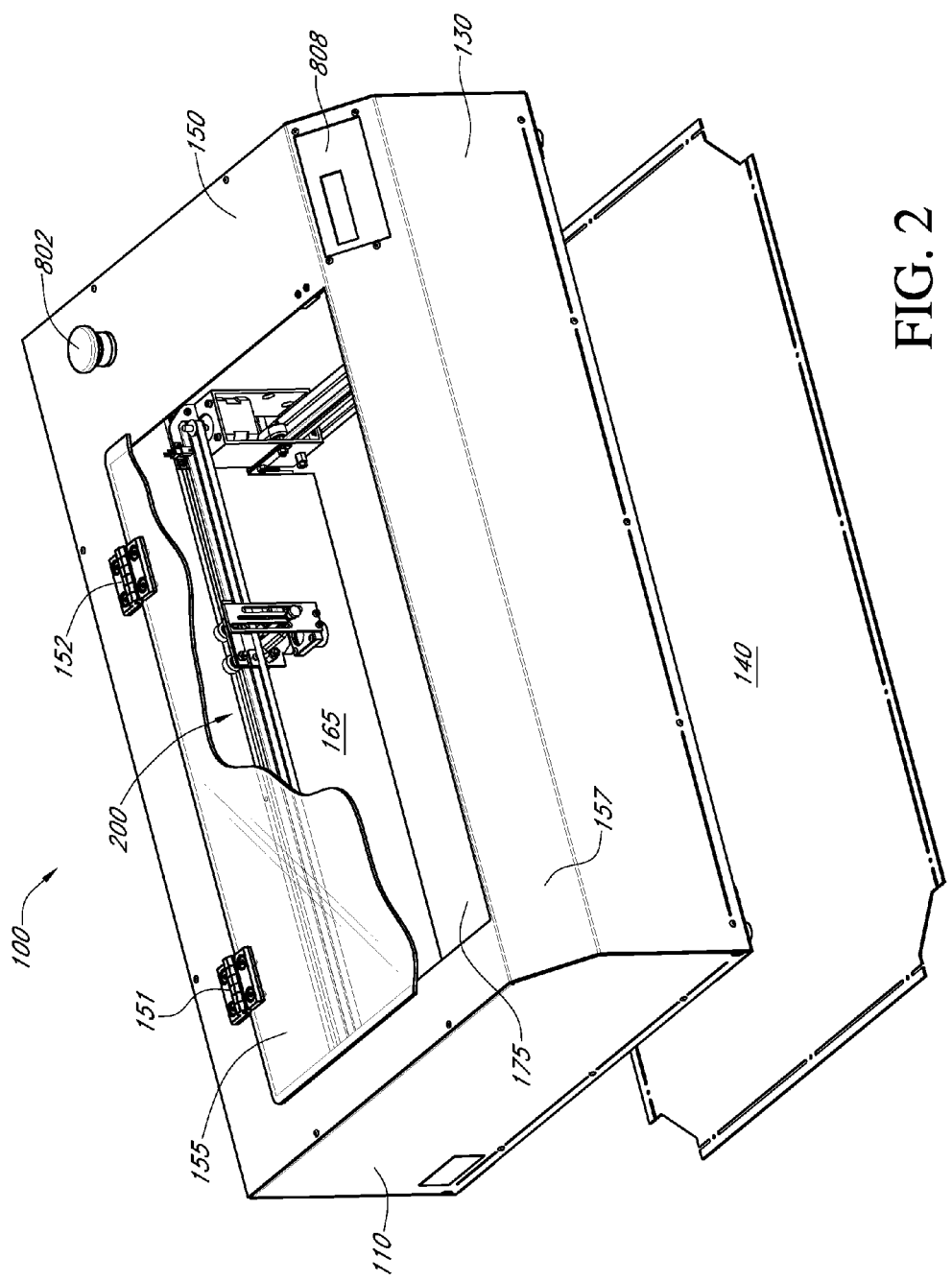
FIG. 2 depicts a partially exploded perspective view of the laser processing system shown in FIG. 1 with a portion of the lid omitted for clarity of illustration and shows the laser processing system with the bottom panel removed.

REFERENCE NUMBERS 25 laser beam
45 engraving plane
95 focal point
100 housing
110 left side panel
120 right side panel
130 front panel
140 bottom panel
150 top member
151 first hinge
152 second hinge
155 lid
157 sloping surface of top member
160 back panel
165 interior panel
175 engraving chamber
200 xy laser beam steering system
210 first y-axis rail
220 second-axis rail
250 x-axis rail
260 y-axis motor
270 y-axis driveshaft
310 first y-axis carriage
320 second y-axis carriage
400 x-axis carriage
430 mounting plate
435 depression in mounting plate
481 first roller
482 second roller
483 third roller
484 fourth roller
491 first nut
492 second nut
493 first eccentric nut
494 second eccentric nut
500 sliding member
511 first slot
512 second slot
515 center slot
521 first locating pin
522 second locating pin
555 locking component
570 linear member housing
580 linear stage
591 first mounting pin
592 second mounting pin
600 focusing lens subassembly
650 focus lens
610 lens holder
980 air assist attachment
700 carriage mirror subassembly
710 carriage mirror mount
739 carriage mirror holder
773 carriage mirror
802 power switch
804 power connection
806 control card connection
808 control panel
860 magnetic safety interlock switch
880 exhaust outlet
910 laser tube
915 beam combiner
920 diode laser and mount
971 first mirror
972 second mirror Laser Processing System Referring to FIGS. 1 and 2, the laser processing system apparatus is shown comprising a housing 100 defining an engraving chamber 175 that is accessed by a lid 155 and includes a removable bottom panel 140. Operatively associated with the engraving chamber 175 is an xy laser beam steering system 200, which is shown in more detail in FIG. 5. The laser processing system of the present invention therefore comprises: (a) housing 100 defining engraving chamber 175, (b) xy laser beam steering system 200 located inside engraving chamber 175, and (c) a focus mechanism that is moveably mounted onto x-axis carriage 400 of xy laser beam steering system 200 (see also FIGS. 5-6).

Housing and Exterior Components

Figure 3:
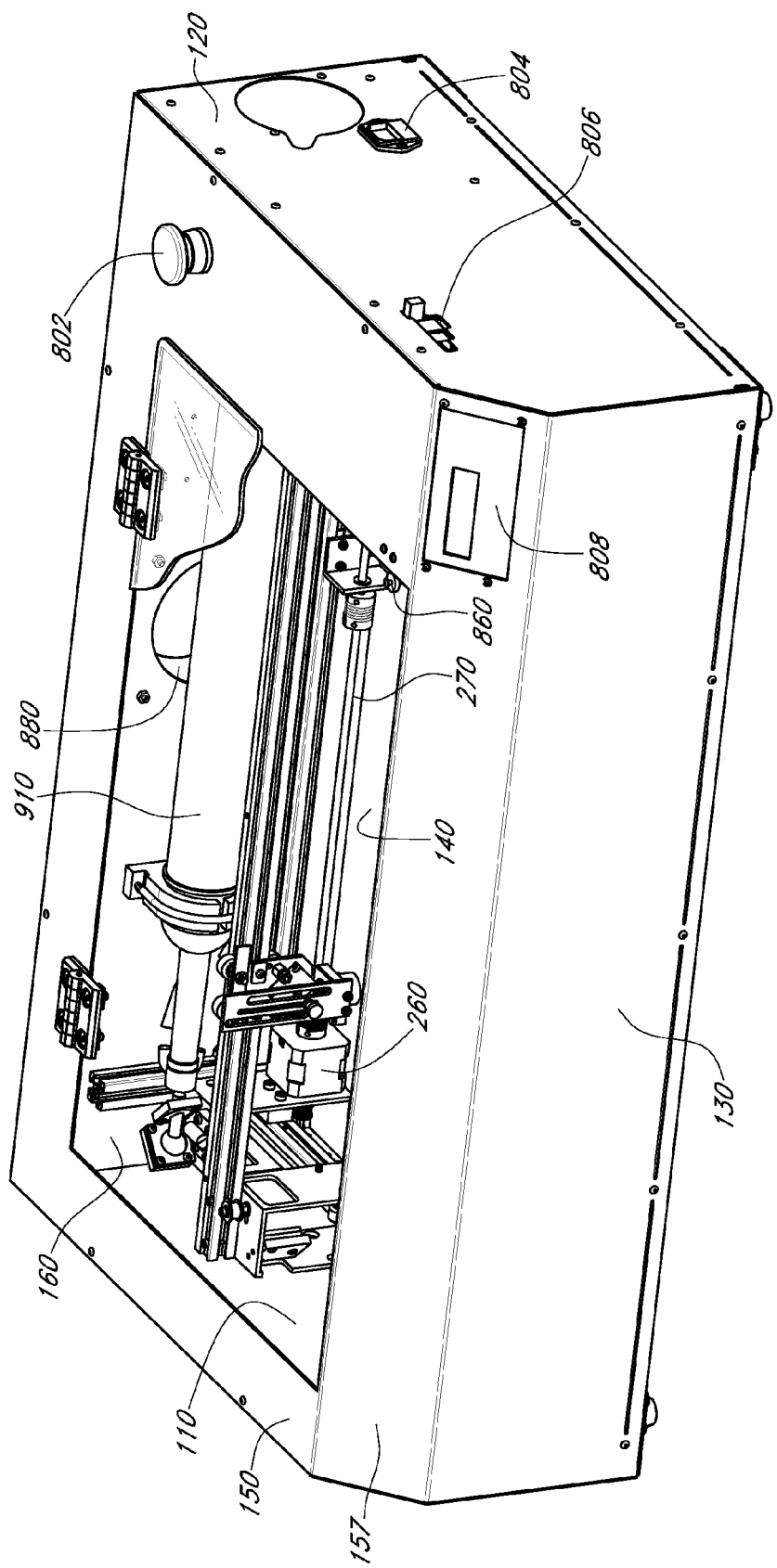
FIG. 3 depicts a perspective view of the laser processing system shown in FIG. 1 with an interior panel omitted for clarity of illustration.

FIGS. 1-3 depict housing 100 in accordance with an embodiment of the present invention. As seen in FIGS. 1-3, the housing is comprised of: a left side panel 110, a right side panel 120, a front panel 130, a bottom panel 140 (shown in FIG. 2), a top member 150, and a back panel 160. In the embodiment of the invention shown in FIGS. 1-3, the following pairs of frame members are positioned parallel to one another: (i) left side panel 110 and right side panel 120, (ii) bottom panel 140 and top member 150, and (iii) front panel 130 and back panel 160. Left side panel 110, right side panel 120, front member 130, bottom panel 140, top member 150, and back panel 160 are configured to form a rectangular prism-like shape wherein engraving chamber 175 is formed therein. FIGS. 1-2 illustrate an embodiment of the invention wherein housing 100 includes an optional interior panel 165 that is parallel to back panel 160. Interior panel 165 may function to cover and/or protect some of the optics and motion components of the present invention such as laser tube 910 and first mirror 971 shown in FIG. 3, which depicts the laser processing system of the present invention without interior panel 165.

The panelized structure of housing 100 allows for the disengagement of one or more panels of housing 100. As shown in FIG. 2, bottom panel 140 is removable in some embodiments of the invention. Bottom panel 140 disengages from left side panel 110, right side panel 120, front panel 130, and back panel 160. When bottom panel 140 is removed from housing 100, the laser processing system can be placed onto a workpiece that exceeds the dimensions of engraving chamber 175. Thus, when bottom panel 140 is removed, the laser processing system of the present invention can cut and engrave materials of any size and thickness. Additionally, the removability of bottom panel 140 allows the laser processing system of the present invention to accommodate a variety of modular attachments as discussed in the proceeding section.

In the embodiment shown in FIGS. 1-3, top member 150 includes lid 155 connected to top member 150 by a first hinge 151 and a second hinge 152. As illustrated in FIG. 1, lid 155 may be comprised of a flat clear plastic for ease of viewing of the interior components of the laser processing system, and lid 155 does not need to be sealed when it is in the closed position. Top member 150 may also include a sloping surface 157 that runs horizontally along front panel 130. A control panel 808 may be positioned on sloping surface 157 as the angled surface of sloping surface 157 permits ease of access and visibility of user control panel 808. Control panel 808 may comprise of a LCD display and may include a power reporting capacitive touch interface wherein its front surface includes painted icons and a screen for data display. The icons correspond to an underlying PCB with pads designed to sense the presence of fingertips. Additionally, control panel 808 can provide reports regarding a variety of criteria such as the state of the laser, including the current driving the tube.

As shown in FIG. 3, a power switch 802 may be positioned on any suitable surface of housing 100 such as on top member 150 for immediate access and visibility. An exhaust outlet 880 is located on back panel 160. A power connection 804 and a control card connection 806 may be positioned on right side panel 120 or on left side panel 130 in other versions of the invention. FIG. 3 also illustrates a magnetic safety interlock switch 860 that deactivates the laser if lid 155 is opened during operation of the laser processing system.

Modular Attachments

The removability of bottom panel 140 from housing 100 as depicted in FIG. 2 allows the present invention to accommodate a variety of modular attachments for enhanced capability and functionality. For instance, the laser processing system may further include one or more modular attachments to perform a specialized function that allows the present invention to process certain types, sizes, and/or shapes of materials. To use the modular attachment, bottom panel 140 is removed from housing 100, and the laser processing system is then stacked onto the modular attachment, although some attachments do not require the removal of bottom panel 140 since these attachments are dimensioned and shaped to fit into engraving chamber 175.

The stackable feature allows the present invention to be stacked on a variety of modular attachments of different kinds, sizes, and shapes since the modular attachment is not restricted to the dimensions and shape of engraving chamber 175. These modular attachments provide enhanced functionality such as part pass-through, automatic conveyor, and part processing and engraving on cylindrical surfaces.

For example, the modular attachment may comprise of a rotary attachment for engraving cylindrical surfaces. The rotary attachment may be a friction-wheel type in which objects rest on two driven and two idling wheels, and the objects are turned to engrave an image onto the surface of the cylindrical object. Because some small objects are very light, the rotary attachment includes two hold-down plates to force light objects into contact with the drive wheel. The rotary attachment works by translating Y motion along a cylindrical surface (i.e., Y-axis motion is sent to the rotary). In some embodiments, the rotary attachment may be used inside engraving chamber 175; however, removing bottom panel 140 can increase the maximum engraving diameter.

In other embodiments, bottom panel 140 can be removed so that the laser processing system can be placed on a frame to allow for thick part processing, a pass-through system, and other functions. The modular attachment may comprise of an automatic conveyor stack attachment or an automatic material handling stack attachment. Additionally, the modular attachment may comprise of one or more alternate subfloors that are specialized for a particular application and/or material, or bottom panel 140 may be interchangeable with alternate bottom panels that are configured and designed to perform specialized functions.

Optics and Motion Components

Figure 4:
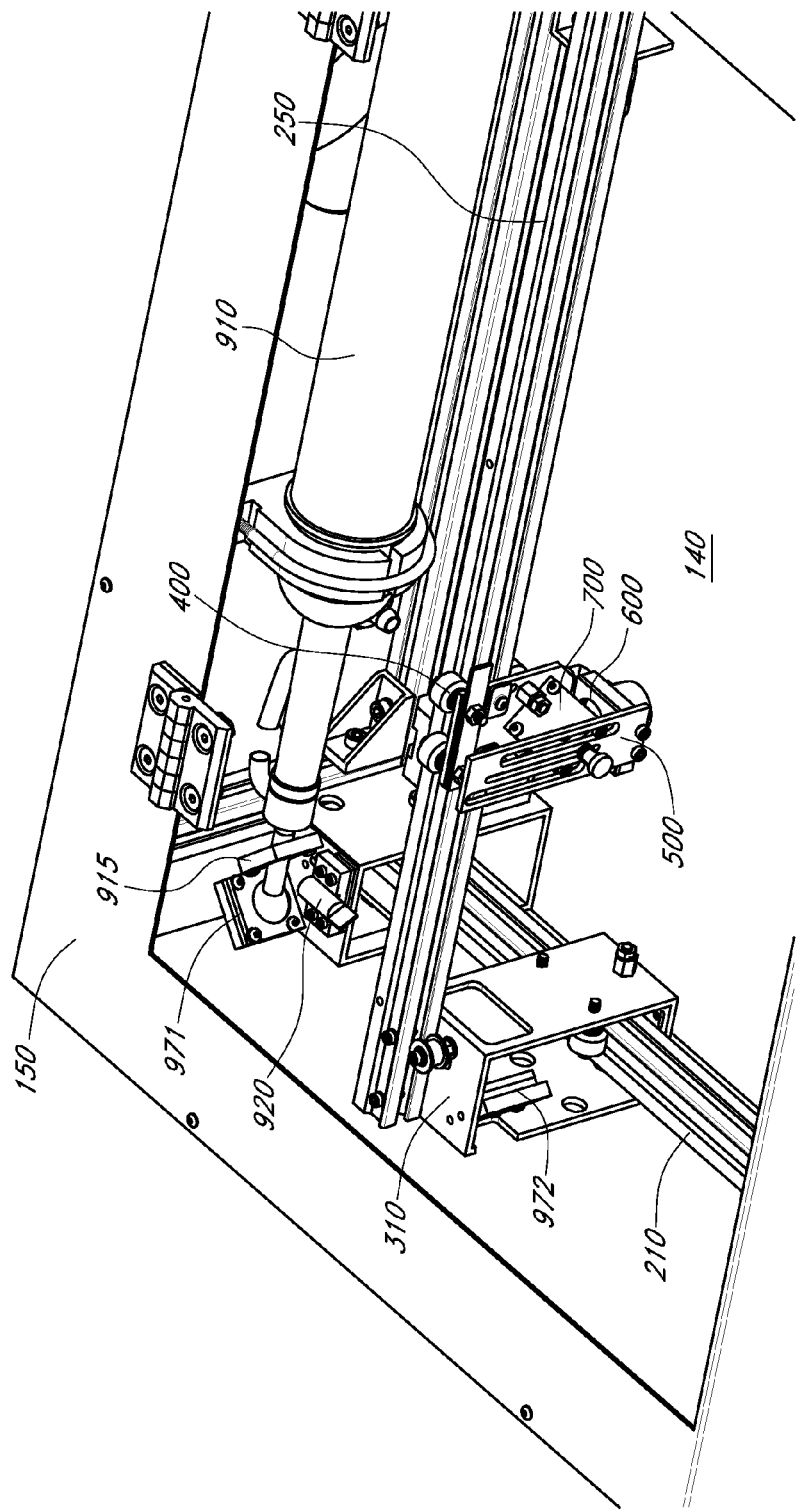
FIG. 4 depicts a perspective view of optics and motion components of the laser processing system shown in FIG. 3.

FIG. 4 depicts a perspective view of some of optics and motion components of the laser processing system of the present invention. In one embodiment, the laser processing system may include: a laser tube 910, a beam combiner 915, diode laser and mount 915, a first mirror 971, and a second mirror 972, which is mounted onto first y-axis carriage 310. Beam combiner 915 (collimator) may be comprised of one piece with a pass-through mount comprising: a rear slot, a front counter bore aligned on the rear slot to allow a laser to pass through the center of the optic, two screws for mounting the optic element, and two mounting screws for mounting beam combiner 915. Also included as part of the optics system of the present invention are a carriage mirror subassembly 700 and a focusing lens subassembly 600 which are both shown in more detail in FIGS. 6-9. Generally, laser tube 910 emits a laser beam that passes through beam combiner 915, and the laser beam reflects off first mirror 971, second mirror 972, and carriage mirror 773 to direct the laser beam trough focusing lens 650 and ultimately onto the workpiece (see FIGS. 8-9 for depictions of carriage mirror 773 and focusing lens 650).

The motion components of the present invention include y-axis motor 260 and y-axis driveshaft 270 which power the movement of the y-axis carriages of xy laser beam steering system 200.

XY Laser Beam Steering System

Figure 5:
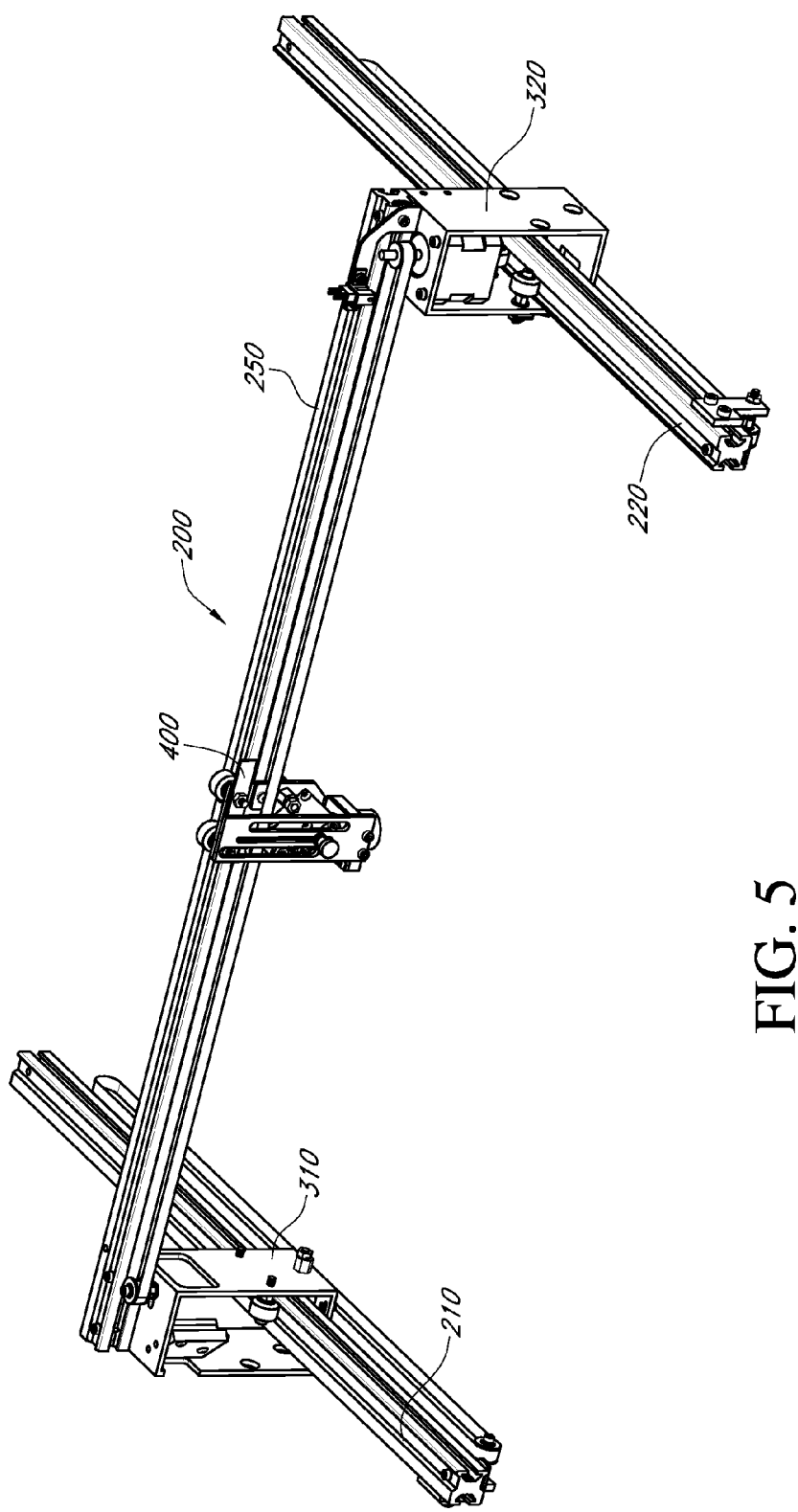
FIG. 5 depicts a perspective view of the xy laser beam steering system shown in FIG. 2.

FIG. 5 illustrates the xy laser beam steering system 200. The xy laser beam steering system 200 is comprised of a pair of y-axis carriages comprising a first y-axis carriage 310 and a second y-axis carriage 320 with a pair of y-axis rails comprised of a first y-axis rail 210 and a second y-axis rail 220 extending there between. An x-axis carriage 400 rides on x-axis rail 250 for axial movement along an x-axis along x-axis rail 250.

Figure 6:
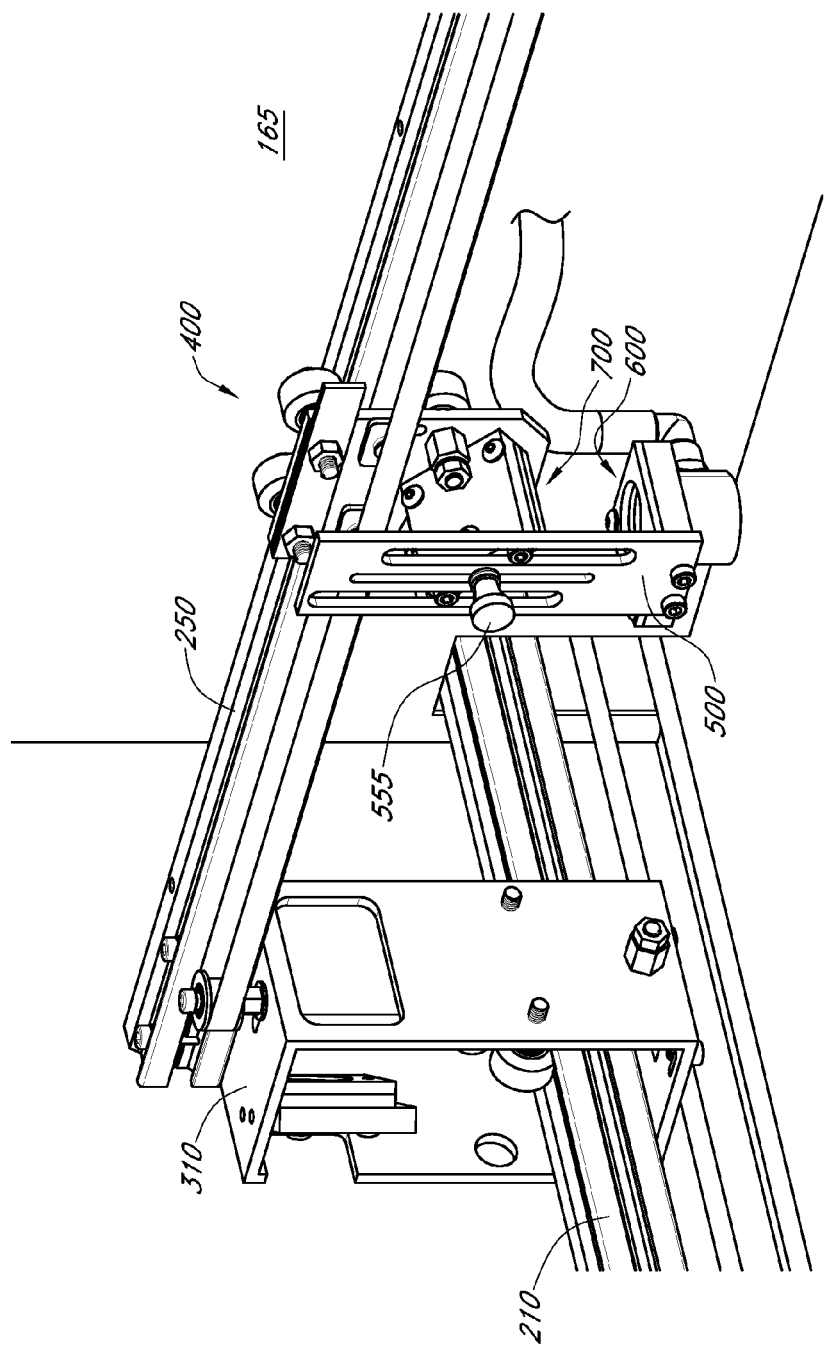
FIG. 6 depicts a perspective view of a portion of the xy laser beam steering system illustrated in FIG. 5.

Still referring to FIG. 5, xy laser beam steering system 200 therefore includes: (a) first y-axis rail 210; (b) second y-axis rail 220 parallel to first y-axis rail 210; (c) first y-axis carriage 310 moveably mounted to first y-axis rail 210 (to allow first y-axis carriage 310 to ride on first y-axis rail 210); (d) second y-axis carriage 320 moveably mounted to second x-axis rail 220 (to allow second y-axis carriage 320 to ride on second y-axis rail 220; (e) x-axis rail 250 that is perpendicular to both first y-axis rail 210 and second y-axis rail 220 wherein one end of x-axis rail 250 is adjoined to first y-axis carriage 310 and the other end of x-axis rail 250 is adjoined to second y-axis carriage 320; and (f) x-axis carriage 400 moveably mounted to x-axis rail 250 (to allow x-axis carriage 400 to ride on x-axis rail 250). FIG. 6 depicts a closer view of first y-axis carriage 310, which rides on first y-axis rail 210 and of x-axis carriage 400, which rides on x-axis rail 250. XY laser beam steering system essentially steers the laser head (i.e., x-axis carriage 400) at a specific location on the surface of a workpiece to cut or engrave the workpiece.

Sliding Focusing Mechanism

As shown in FIG. 6, the sliding, non-telescoping focus mechanism of the present invention resides on x-axis carriage 400. The focusing mechanism comprises: (a) a carriage mirror subassembly 700 attached to x-axis carriage 400, (b) a sliding member 500 including a linear guiding component and a locking component 555 wherein sliding member 500 is moveably attached to carriage mirror subassembly 700, and (c) a focusing lens subassembly 600 attached to a lower end of sliding member 500.

Figure 7:
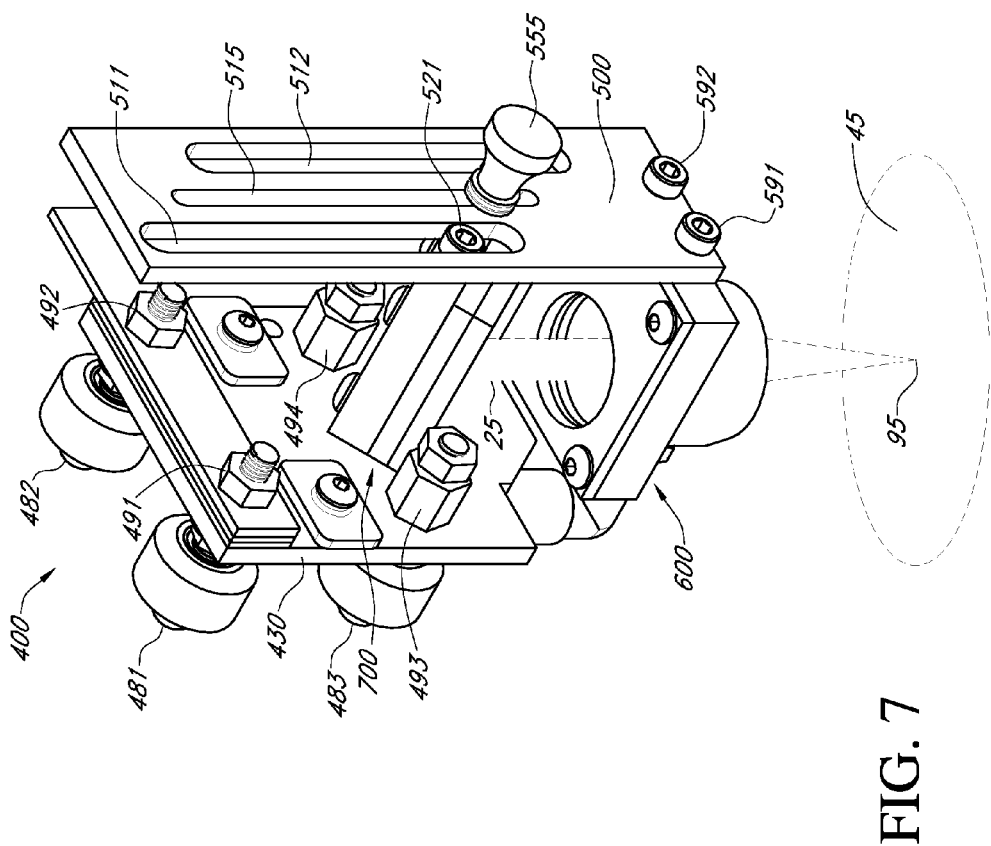
FIG. 7 depicts a perspective view of the x-axis carriage shown in FIG. 6 with the sliding member at its highest position.

As shown in FIG. 7, carriage mirror subassembly 700 and focusing lens subassembly 600 are configured to receive and focus a laser beam 25 to a focal point 95. Focusing lens subassembly 600 is adjusted along the z-axis of engraving chamber 175 by disengaging locking component 555 and vertically sliding member 500, which is sometimes referred to herein as an actuating arm. When sliding member 500 is slid vertically, sliding member does not telescope with another member when adjusting the position of focusing lens subassembly 600 along the z-axis. In other words, sliding member 500 is not inserted into another enclosed member, nor is another member inserted inside sliding member 500 to adjust the position of focusing lens subassembly 600 along the z-axis. Sliding member is comprised of one or more exposed members that are not covered, enclosed or telescoped by another member to adjust focusing lens subassembly 600 as in other mechanisms used by other laser processing systems. Therefore, the non-telescoping focusing mechanism of the present invention is not limited in vertical distance and movement as in mechanisms that utilize telescoping members, which are limited to the shortest vertical length of the telescoping members.

The x-axis carriage 400 is depicted in FIG. 7 and carries carriage mirror subassembly 700 optically coupled to focusing lens subassembly 600. Carriage mirror subassembly 700 and focusing lens subassembly 600 are configured to receive and focus a laser beam 25 to a focal point 95. In the embodiment shown in FIGS. 6-9, sliding member 500 is comprised of a flat plate including a first mounting pin 591 and a second mounting pin 592 for focusing lens subassembly 600. Focusing lens subassembly 600 is mounted to sliding member 500 via first mounting pin 591 and second mounting pin 592.

The linear guide component of the sliding member may include one or more slots, pins, screws and/or rails or any another suitable mechanism that linearly guides the sliding member's vertical motion and helps secure the sliding member into a vertical position. For example, as shown in FIG. 7, Sliding member 500 includes a linear guiding component comprised of a first slot 511, a second slot 512, and a center slot 515 in between first slot 511 and second slot 512. First slot 511 and second slot 512 are in operative association with a first locating pin 521 and a second locating pin 522, respectively; and center slot 515 is in operative association with a locking component 555. Thus, first slot 511, second slot 512, center slot 515, first locating pin 521, second locating pin 522, and locking component 555 all work together to help linearly guide the vertical movement of sliding member 500.

As shown in FIG. 7, first slot 511, second slot 512, and center slot 515 are configured so that the focusing lens subassembly 600 is able to move along the z-axis of engraving chamber 175 when locking component 555 is loosened. This design allows the top of sliding member 500 to move above the path of laser beam 25 that is traveling directly into carriage mirror subassembly 700. First slot 511 and second slot 512 slide over first locating pin 521 and second locating pin 522, respectively, which force the sliding member 500 to maintain focusing lens subassembly 600 parallel to an engraving plane 45 when locking component 555 is tightened. The removal of bottom panel 140 (see FIG. 2) allows engraving plane 45 to be moved outside of the normal bounds of engraving chamber 175 and onto workpieces located below housing 100. When sliding mechanism 500 is fully retracted, it utilizes the space between the top of the xy beam steering system 200 and lid 155, therefore expanding the capabilities of the present invention while also maintaining compactness.

Still referring to FIG. 7, x-axis carriage 400 includes a mounting plate 430 to which carriage mirror subassembly 700 is attached. X-carriage 400 is engaged with x-axis rail 250 and travels along x-axis rail 250 via a plurality of rollers comprising: a first roller 481, a second roller 482, a third roller 483, and a fourth roller 484 (not shown in FIG. 7), which engage x-axis carriage 400 with a guide channel located on x-axis rail 250 to move x-axis carriage 400 horizontally within engraving chamber 175. First roller 481 and second roller 482 are fixed rollers, whereas third roller 483 and fourth roller 484 are eccentric rollers that can be adjusted during the roller/wheel alignment of x-axis carriage 400 onto x-axis rail 250. On the opposite side of mounting plate 430, x-axis carriage 400 further includes: a first nut 491 securing first roller 481, a second nut 492 securing second roller 482, a first eccentric nut 493 securing third roller 483, and a second eccentric nut 494 securing fourth roller 484. When aligning x-axis carriage 400 onto x-axis rail 250, first eccentric nut 493 and second eccentric nut 494 can be loosened or tightened to adjust third roller 483 and fourth roller 484, respectively. First eccentric nut 493 and second eccentric nut 494 allows for variable friction between third roller 483 and fourth roller 484, respectively, allow for adjustment and alignment of x-axis carriage 400.

Figure 8:
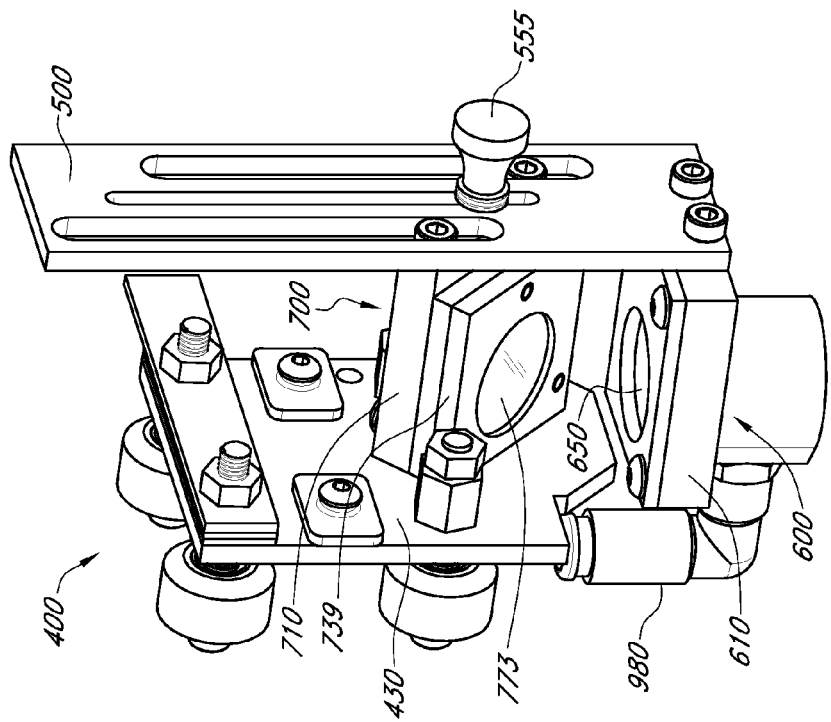
FIG. 8 depicts another perspective view of the x-axis carriage illustrated in FIG. 7 with the sliding member slightly lowered from its highest position.
Figure 9:
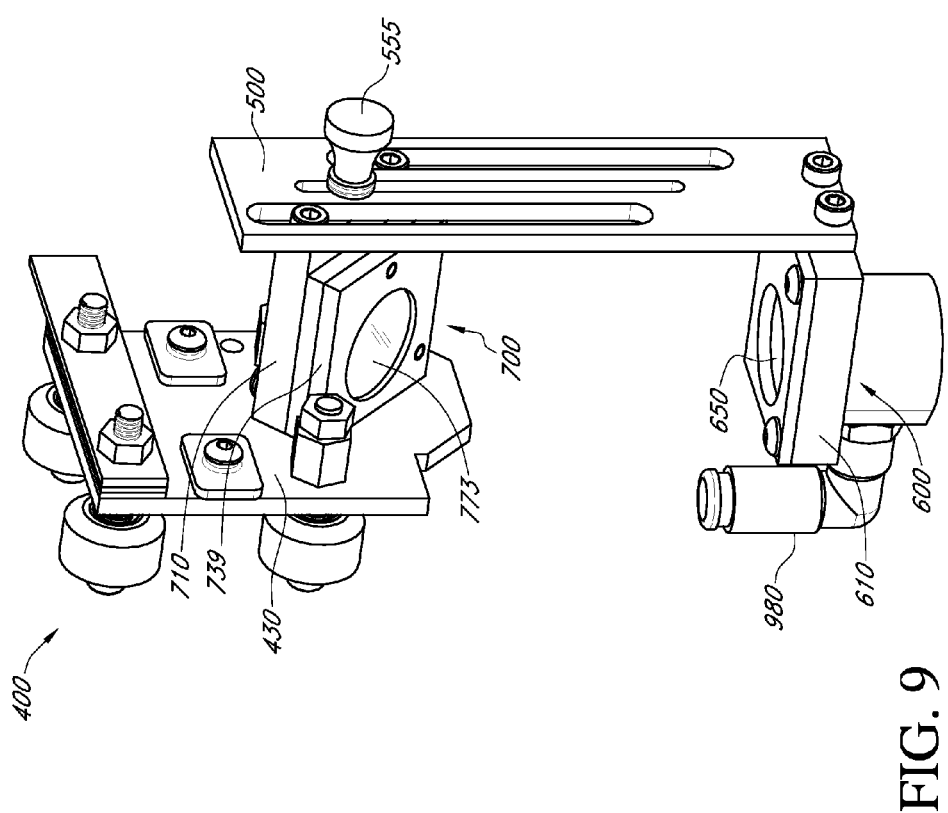
FIG. 9 depicts a perspective view of the x-axis carriage illustrated in FIG. 8 with the sliding member at its lowest position.

FIG. 7 depicts x-axis carriage 400 wherein sliding member 500 is at its highest position (i.e., focusing lens subassembly 600 is at its closest possible position to carriage mirror subassembly 700). FIG. 8 depicts x-axis carriage 400 with sliding member 500 slightly lowered from its highest position shown in FIG. 7. FIG. 9 depicts x-axis carriage 400 with sliding member 500 at its lowest position (i.e., focusing lens subassembly 600 is at its furthest possible position from carriage mirror subassembly 700). As seen in FIGS. 8-9, carriage mirror subassembly 700 includes carriage mirror mount 710, a carriage mirror holder 739, and a carriage mirror 773. Carriage mirror mount 710 includes an aperture through which locking component 555 is inserted to secure sliding member 500 in place. Focusing lens subassembly 600 includes a lens holder 610 and a focus lens 650. Lens holder 610 can be interchanged with other designs to allow for different focal length lenses. A quick-change focusing lens subassembly 600 allows variable thickness/focal length lenses. Also, an air assist attachment 980 is attached to the rear of focusing lens subassembly 600 as illustrated in FIGS. 8-9, and air assist attachment 980 comprises a bulkhead mount air coupler for collimated debris removable. Although an air assist attachment can function with multiple lenses, different air assist attachments are possible for extra thick/thin lenses.

As depicted in the embodiment shown in FIGS. 6-9, sliding member 500 includes a linear guiding component including first slot 511 positioned on an outer edge of sliding member 500, second slot 512 positioned on the opposite outer edge on which 511 is located, and a center slot 515 of elliptical profile, but other profiles and numbers of slots may be suitable as well in alternate embodiments of the invention. For example, in other embodiments of the invention, sliding member 500 may include a linear guiding component comprising one slot, two slots, four slots, five slots, or six slots. In an alternate embodiment, the linear guiding component may include pins, screws and/or rails or any another suitable mechanism that linearly guides the sliding member's vertical motion. For instance, linear guiding component may include a vertical rail to which sliding member 500 is moveably attached to allow sliding member 500 to travel vertically on the vertical rail. Sliding member 500 may be attached directly to the vertical rail, or it may be attached to an intermediary structure such as a mounting plate that is moveably attached to and engages directly with the vertical rail. In another embodiment, linear guiding component may be comprised of a stage and a vertical rail wherein the stage moves vertically and the vertical rail remains fixed; or in alternative versions, the stage remains fixed and the vertical rail travels vertically. In an additional embodiment of the invention, sliding member 500 includes a linear stage and a linear guiding component including one or more cylindrical motion guides, such as screws or rails, wherein the linear stage is guided along the vertical axis and is connected operatively to focusing lens subassembly 600. Yet, in a further embodiment, sliding member 500 includes a motorized mechanism to automatically adjust the vertical position of sliding member 500 to thereby adjust the position of the focusing lens subassembly 600. For example, sliding member 500 may include a powered vertical stage controlled by the engraving machine motion controller.

In varying embodiments of the invention, sliding member 500 may be moveably engaged to carriage mirror subassembly 700 or moveably engaged to a linear carriage (e.g., x-axis carriage 400), and the linear guiding component may be attached to carriage mirror subassembly 700 and/or to a linear carriage (e.g., x-axis carriage 400).

Also, FIGS. 6-9 depict an embodiment of the invention in which locking component 555 is comprised of a locking screw. However, other locking mechanisms are possible such as those comprising a retaining pin, male/female structure that include one or more screws, pins, snaps, clips, and other complementary engaging members, and any other suitable locking mechanisms known in the art. Additionally, sliding member 500 may be comprised of other shapes, sizes, and configurations (e.g., sliding member 500 may be elliptical instead of rectangular, cylindrical, linear, etc.). Furthermore, sliding member 500 is interchangeable with alternate-sized sliding members. For instance, a longer sliding member can be used with the present invention to provide longer distances between focusing lens subassembly 600 and carriage mirror subassembly 700 and/or to allow focusing lens subassembly 600 to get closer to a particular workpiece.

Figure 10:
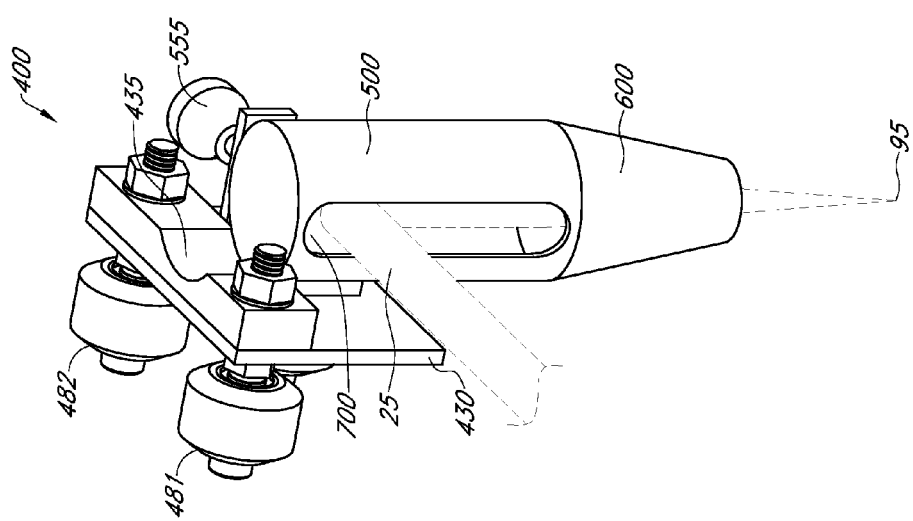
FIG. 10 depicts a perspective view of an x-axis carriage in accordance with an embodiment of the present invention.
Figure 11:
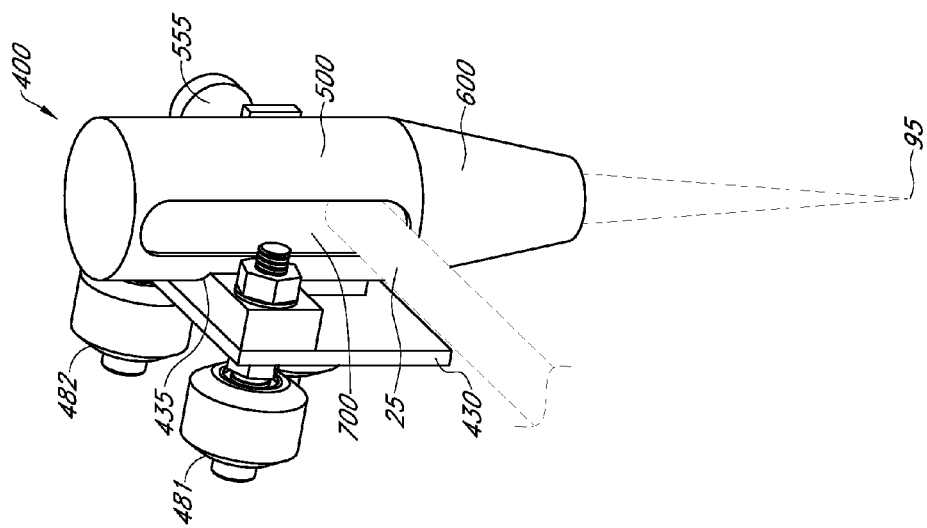
FIG. 11 depicts a perspective view of the x-axis carriage shown in in FIG. 10 with the sliding member at its highest position.

Another embodiment of the focusing mechanism of the present invention is shown in FIGS. 10-11, and depicts carriage mirror subassembly 700 optically coupled to focusing lens subassembly 600. FIG. 10 depicts sliding member 500 in a low position such that focusing lens subassembly 600 is at a distance from carriage mirror subassembly 700, and FIG. 11 depicts sliding member 500 in its highest position such that focusing lens subassembly 600 is closest to carriage mirror subassembly 700. Carriage mirror subassembly 700 and focusing lens subassembly 600 are configured to receive and focus a laser beam 25 to a focal point 95. In this embodiment of the invention, the actuating arm/sliding member 500 is cylindrical and mounted to focusing lens subassembly 600. Sliding member 500 is fixed in space when locking component 555 is engaged with sliding member 500. Sliding member 500 is comprised of a cylinder including three slots: one slot to allow laser beam 25 to enter the interior and reflect off of carriage mirror subassembly 700, a second slot to provide clearance for carriage mirror subassembly mount 710, and a third slot to provide clearance for locking component 555. The bottom of the cylindrical sliding member 500 is open and may be threaded to mate with focusing lens subassembly 600. This configuration also allows part of sliding member 500 to pass above laser beam 25. Also depicted in FIGS. 10-11 are first roller 481 and second roller 482 attached to mounting plate 430, which includes a depression 435 adapted to receive cylindrical sliding member 500 as it is moved vertically upward and downward to adjust the position of focusing lens subassembly 600 along the z-axis.

Figure 12:
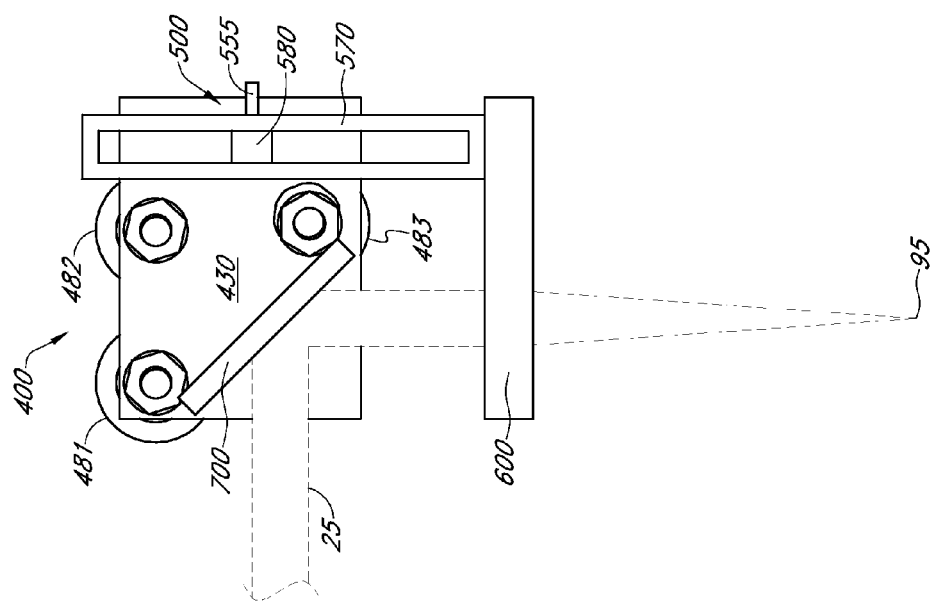
FIG. 12 depicts a front view of an x-axis carriage in accordance with an embodiment of the present invention.
Figure 13:
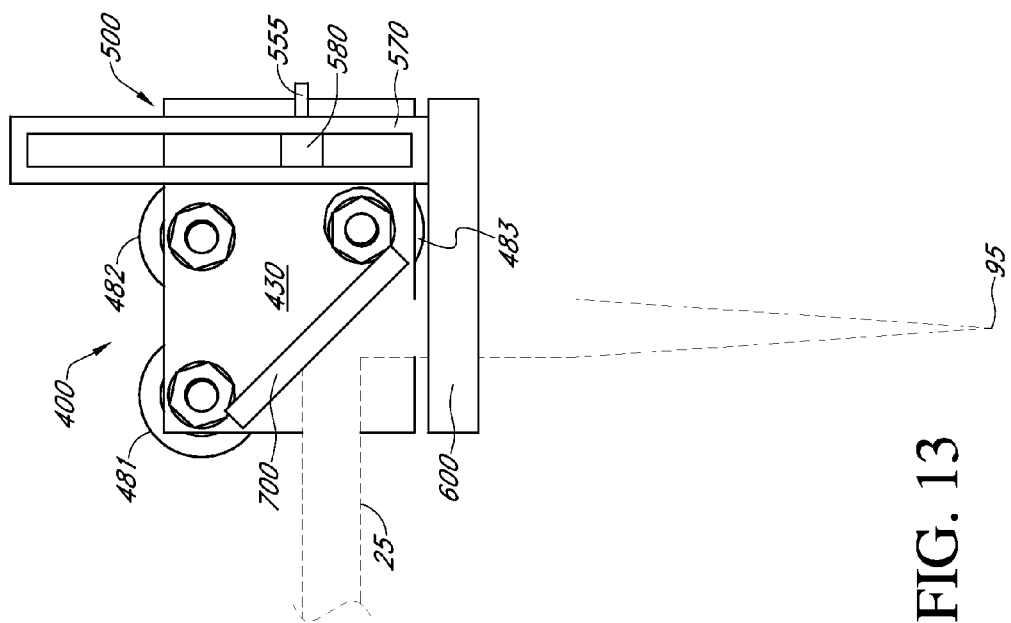
FIG. 13 depicts a front view of the x-axis carriage shown in FIG. 12 with the sliding member at a higher position than depicted in FIG. 12.

A further embodiment of the focusing mechanism of the present invention is shown in FIGS. 12-13, and depicts carriage mirror subassembly 700 optically coupled to focusing lens subassembly 600. FIG. 12 depicts sliding member 500 in a low position such that focusing lens subassembly 600 is at a distance from carriage mirror subassembly 700, and FIG. 13 depicts sliding member 500 at a higher position such that focusing lens subassembly 600 is closer to carriage mirror subassembly 700 than as depicted in FIG. 12. Carriage mirror subassembly 700 and focusing lens subassembly 600 are configured to receive and focus a laser beam 25 to focal point 95. In this embodiment, actuating arm/sliding member 500 is a linear slider subassembly mounted to focusing lens subassembly 600. Focusing lens subassembly 600 is fixed in space when locking component 555 is engaged to sliding member 500. The linear slider/sliding member 500 is comprised of a linear stage 580 mounted to x-axis carriage 400 and contained in a linear member housing 570 which itself is mounted to focus lens subassembly 600. This configuration also allows part of the actuating arm/sliding member 500 to pass above laser beam 25. Also shown in FIGS. 12-13 are first roller 481, second roller 482, and third roller 483 attached to mounting plate 430. In the embodiment of the invention depicted in FIGS. 12-13, sliding member 500 is not attached to carriage mirror subassembly 700 as in the embodiment illustrated in FIGS. 6-9. Rather, sliding member 500 is moveably mounted onto mounting plate 430 to allow sliding member 500 to vertically travel upward and downward to adjust the position of focusing lens subassembly 600 along the z-axis.

As shown in the embodiments of the invention depicted in FIGS. 7-13, carriage mirror subassembly 700 and focusing lens subassembly 600 are configured to receive and focus laser beam 25 to focal point 95 wherein focus lens 650 of focusing lens subassembly 600 is perpendicular to laser beam 25. Lens holder 610 may be comprised of any shape, and in embodiments of the invention wherein carriage mirror 773 is comprised of an articulated mirror, then focus lens 650 would rotate with carriage mirror 773 to maintain perpendicularity to laser beam 25.

EXAMPLES

In the foregoing description of embodiments of the invention, reference was made to the accompanying figures, which form a part of this application. The figures show, by way of illustration, certain embodiments in which the invention may be practiced. It is to be understood that other variations are possible and modifications may be made without departing from the scope of the present invention. A variety of embodiments are possible wherein each embodiment includes a different combination of the different aspects and elements of the present invention.

For example, in one embodiment as shown in FIGS. 1-9, a laser processing system is comprised of: (a) housing 100 defining engraving chamber 175, (b) xy laser beam steering system 200 located inside engraving chamber 175, and (c) a non-telescoping focus mechanism. As shown in FIG. 5, xy laser beam steering system 200 includes: (i) first y-axis rail 210, (ii) second y-axis rail 220 parallel to first y-axis rail 210, (iii) first y-axis carriage 310 moveably mounted to first y-axis rail 210, (iv) second y-axis carriage 320 moveably mounted to second x-axis rail 220, (v) x-axis rail 250 perpendicular to both first y-axis rail 310 and second y-axis rail 320 wherein one end of x-axis rail 250 is adjoined to first y-axis carriage 310 and the other end of x-axis rail 250 is adjoined to second y-axis carriage 320, and (vi) x-axis carriage 400 moveably mounted to x-axis rail 250. As depicted in FIGS. 7-11, non-telescoping focus mechanism comprises: (i) carriage mirror subassembly 700 attached to x-axis carriage 400, (ii) sliding member 500 which includes a linear guiding component and a locking component 555 wherein sliding member 500 is moveably attached to carriage mirror subassembly 700, and (iii) focusing lens subassembly 600 attached to a lower end of sliding member 500. Carriage mirror subassembly 700 and focusing lens subassembly 600 are configured to receive and focus a laser beam 25 to focal point 95. Focusing lens subassembly 600 is adjusted along the z-axis of engraving chamber 175 by disengaging locking component 555 and vertically moving sliding member 500.

In the embodiment of the invention shown in FIG. 7, sliding member 500 is comprised of a flat plate and the a linear guiding component is comprised of first slot 511, second slot 512, and center slot 515 wherein locking component 555 is engaged with center slot 515 to hold focusing lens subassembly 600 at a position along the z-axis. As depicted in FIGS. 8-9, focusing lens subassembly 600 includes focus lens 650 and lens holder 610, which is interchangeable to allow for different focal length lenses. X-axis carriage 400 comprises a plurality of rollers that move x-axis carriage 400 along x-axis rail 250. As shown in FIG. 7, the plurality of rollers comprises (i) first roller 481 (first fixed roller), (ii) second roller 482 (second fixed roller), (iii) third roller 483 (first eccentric roller), and (iv) fourth roller 484 (second eccentric roller) wherein third roller 483 and fourth roller 484 can each be adjusted to align x-axis carriage 400 along x-axis rail 250.

In the foregoing example and as shown in FIGS. 1-3, housing 100 may be comprised of: (i) left side panel 110, (ii) right side panel 120, (iii) front panel 130, (iv) bottom panel 140, (v) top member 150, and (vi) back panel 160. The aforementioned panels are configured to form engraving chamber 175 defined by housing 100. In some versions of the invention, bottom panel 140 is removable as illustrated in FIG. 2. When bottom panel 140 is removed, the laser processing system of the present invention can be placed onto a workpiece that is larger than the engraving chamber. The laser processing system may further comprise one or more modular attachments for a specialized function wherein the laser processing system is stacked onto the modular attachment when bottom panel 150 is removed. For example, the laser processing system may further include a rotary attachment for engraving cylindrical surfaces. In another example, the laser processing system may further include an automatic conveyor attachment and/or an automatic material handling stack attachment.

In another example, an alternate embodiment of the invention is directed to a non-telescoping focus mechanism for a laser processing system as depicted in FIGS. 6-13. The non-telescoping focus mechanism is comprised of: (a) carriage mirror subassembly 700 including carriage mirror 773 and carriage mirror mount 710 wherein carriage mirror subassembly 700 is attached to a linear carriage such as x-axis carriage 400 of the laser processing system; (b) sliding member 500 that is moveably engaged with x-axis carriage 400 and includes a linear guiding component and locking component 555; and (c) focusing lens subassembly 600 that is attached perpendicularly to a lower end of sliding member 500 and includes lens holder 610 and focus lens 650. Carriage mirror 773 and focus lens 650 are configured to receive and focus laser beam 25 to a focal point 95. Focusing lens subassembly 600 is adjusted to a vertical position by vertically sliding the sliding member 500 and focusing lens subassembly 600 is locked into the vertical position by engaging locking component 555 with sliding member 500. In one version of the invention as shown in FIGS. 6-9, sliding member 500 is a flat plate, the linear guiding component includes at least one slot, and locking component 555 is a locking screw that engages with sliding member 500 by inserting the locking screw 555 into the at least one slot. In some versions of this embodiment, the laser processing system includes a housing 100 comprising removable bottom panel 140 (see FIG. 2).

In one embodiment of the foregoing example, the sliding member is cylindrical as illustrated in FIGS. 10-11. In this embodiment, the linear guiding component is comprised of (i) a first slot that allows laser beam 25 to enter sliding member 500 and to reflect off the carriage mirror 773, (ii) a second slot that provides clearance for the carriage mirror mount 773, and (iii) a third slot that provides clearance for locking component 555. Carriage mirror 773 and carriage mirror mount 773 are not shown in FIGS. 10-11 since they reside inside of sliding member 500. Yet, in another embodiment of the invention as illustrated in FIGS. 12-13, sliding member 500 is a linear member comprising of (i) linear stage 580 moveably mounted to x-axis carriage 400 and (ii) linear member housing 570 that surrounds linear stage 580. In an additional embodiment, the linear guiding component is comprised of a vertical rail and sliding member 500 is moveably attached to the vertical rail to allow sliding member 500 to travel vertically. Sliding member 500 may include a motorized mechanism to vertically move sliding member 500 (e.g., sliding member 500 may include a powered vertical stage controlled by the engraving machine motion controller).

In a further example, a non-telescoping focus mechanism for a laser processing system is depicted in FIGS. 6-9 and is comprised of: (a) carriage mirror subassembly 700 including (i) a first lateral side attached to x-axis carriage 400 and (ii) a second lateral side opposite the first lateral side wherein the second lateral side includes lock aperture; (b) sliding plate 500 that is moveably attached to the second lateral side of carriage mirror subassembly 700 and includes (i) locking component 555 and (ii) a linear guiding component; and (c) focusing lens subassembly 600 attached perpendicularly to a lower end of sliding plate 500 wherein carriage mirror subassembly 700 and focusing lens subassembly 600 are configured to receive and focus a laser beam 25 to a focal point 95 (see FIG. 7). Focusing lens subassembly 600 is adjusted to a vertical position by vertically sliding the sliding plate 500, and focusing lens subassembly 600 is locked into the vertical position by inserting locking component 555 into the lock aperture on the carriage mirror subassembly 700. Locking component 555 may be comprised of a locking screw or any suitable locking mechanism known in the art. Also, sliding plate 500 is interchangeable with an alternate-length sliding plate (e.g., longer sliding plate) to provide varying focal lengths.

In one embodiment of the foregoing example as shown in FIG. 7, the linear guiding component includes a center slot 515 that runs longitudinally along sliding plate 500, a first slot 511, and second slot 512 that run parallel to center slot 515. Locking component 555 is moveably engaged with center slot 515. Center slot 515 is positioned between first slot 511 and second slot 512. The non-telescoping focus mechanism may further include first locating pin 521 and second locating pin 522 that are attached to the second lateral side of carriage mirror subassembly 700. First slot 511 slides over first locating pin 521 and second slot 512 slides over second locating pin 511 to maintain focusing lens subassembly 600 parallel to engraving plane 45. In some versions of this embodiment, the laser processing system includes a housing 100 comprising a removable bottom panel 140 (see FIG. 2).

Although the present invention has been described above in considerable detail with reference to certain versions thereof, other versions are possible. Many of the elements of the invention may be of alternate suitable shapes, sizes, and/or configurations; may further include structures not described hereinabove; may exclude one or more components described above, and may be positioned at alternate suitable locations within the apparatus without departing from the spirit and scope of the present invention.

The attached figures depicting various embodiments of the invention are primarily intended to convey the basic principles embodied in the present invention. Thus, the present invention may further include additional structures and features not illustrated in the figures. Also, various structures of the present invention such as the dimensions, shapes, and configuration of the interchangeable components and modular attachments may be customized to accommodate a particular size, shape and/or type of material.

While the description above refers to particular embodiments of the present invention, it will be understood that many modifications may be made without departing from the spirit thereof. The presently disclosed embodiments are therefore to be considered in all respects as illustrative and not restrictive.

What is claimed is:

1. A laser processing system comprising:
a housing defining an engraving chamber;
an xy laser beam steering system located inside the engraving chamber,
the xy laser beam steering system comprising
a first y-axis rail,
a second y-axis rail parallel to the first y-axis rail,
a first y-axis carriage moveably mounted to the first y-axis rail,
a second y-axis carriage moveably mounted to the second x-axis rail,
an x-axis rail perpendicular to both the first y-axis rail and the second y-axis rail wherein a first end of the x-axis rail is adjoined to the first y-axis carriage and a second end of the x-axis rail is adjoined to the second y-axis carriage, and
an x-axis carriage moveably mounted to the x-axis rail; and
a non-telescoping focus mechanism comprised of
a carriage mirror subassembly attached to the x-axis carriage,
a sliding member moveably attached to the carriage mirror subassembly, the sliding member comprising
a linear guiding component and
a locking component, and
a focusing lens subassembly attached to a lower end of the sliding member wherein the carriage mirror subassembly and the focusing lens subassembly are configured to receive and focus a laser beam to a focal point and wherein the focusing lens subassembly is adjusted along a z-axis of the engraving chamber by disengaging the locking component and vertically sliding the sliding member.

2. The laser processing system of claim 1 wherein the sliding member is comprised of a flat plate and the linear guiding component is comprised of a first slot, a second slot, and a center slot wherein the locking component is engaged with the center slot to hold the focusing lens subassembly at a position along the z-axis.

3. The laser processing system of claim 1 wherein the x-axis carriage comprises a plurality of rollers that move the x-axis carriage along the x-axis rail, the plurality of rollers comprising a first fixed roller, a second fixed roller, a first eccentric roller, and a second eccentric roller wherein the first eccentric roller and the second eccentric roller can each be adjusted to align the x-axis carriage along the x-axis rail.

4. The laser processing system of claim 1 wherein the housing is comprised of a left side panel, a right side panel, a front panel, a bottom panel, a top member, and a back panel, and the left side panel, the right side panel, the front panel, the bottom panel, the top member, and the back panel are configured to form the engraving chamber wherein the bottom panel is removable.

5. The laser processing system of claim 4 further including a modular attachment for a specialized function wherein the laser processing system is stacked onto the modular attachment when the bottom panel is removed.

6. The laser processing system of claim 5 wherein the modular attachment is a rotary attachment and the specialized function is engraving cylindrical surfaces.

7. A non-telescoping focus mechanism for a laser processing system comprising:
a carriage mirror subassembly attached to a linear carriage of the laser processing system, the carriage mirror subassembly comprising
a carriage mirror and
a carriage mirror mount;
a sliding member moveably engaged with the linear carriage, the sliding member comprising
a linear guiding component and
a locking component; and a focusing lens subassembly attached to a lower end of the sliding member, the focusing lens assembly comprising
a lens holder and
a focus lens wherein the carriage mirror and the focus lens are configured to receive and focus a laser beam to a focal point and wherein the focusing lens subassembly is adjusted to a vertical position by vertically sliding the sliding member and the focusing lens subassembly is locked into the vertical position by engaging the locking component with the sliding member.

8. The non-telescoping focus mechanism of claim 7 wherein the linear carriage is an x-axis carriage.

9. The non-telescoping focus mechanism of claim 7 wherein the linear guiding component is comprised of at least one slot and the locking component is a locking screw that engages with the sliding member by inserting the locking screw into the at least one slot.

10. The non-telescoping focus mechanism of claim 7 wherein the sliding member is a flat plate.

11. The non-telescoping focus mechanism of claim 7 wherein the sliding member is cylindrical and the linear guiding component is comprised of a first slot that allows the laser beam to enter the sliding member and to reflect off the carriage mirror, a second slot that provides clearance for the carriage mirror mount, and a third slot that provides clearance for the locking component.

12. The non-telescoping focus mechanism of claim 8 wherein the sliding member is a linear member comprising a linear stage moveably mounted to the x-axis carriage and a linear member housing that surrounds the linear stage.

13. The non-telescoping focus mechanism of claim 7 wherein the laser processing system includes a housing comprising a removable bottom panel.

14. The non-telescoping focus mechanism of claim 7 wherein the linear guiding component is comprised of a vertical rail and the sliding member is moveably attached to the vertical rail.

15. The non-telescoping focus mechanism of claim 7 wherein the sliding member includes a motorized mechanism to vertically move the sliding member.

16. A non-telescoping focus mechanism for a laser processing system comprising:
a carriage mirror subassembly including
a first lateral side attached to an x-axis carriage of the laser processing system and
a second lateral side opposite the first lateral side wherein the second lateral side includes a lock aperture;
a sliding plate moveably attached to the second lateral side of the carriage mirror subassembly, the sliding plate comprising
a locking component and
a linear guiding component; and
a focusing lens subassembly attached perpendicularly to a lower end of the sliding plate wherein the carriage mirror subassembly and the focusing lens subassembly are configured to receive and focus a laser beam to a focal point and wherein the focusing lens subassembly is adjusted to a vertical position by vertically sliding the sliding plate and the focusing lens subassembly is locked into the vertical position by inserting the locking component into the lock aperture.

17. The non-telescoping focus mechanism of claim 16 wherein the laser processing system includes a housing comprising a removable bottom panel.

18. The non-telescoping focus mechanism of claim 16 wherein the linear guiding component comprises a center slot that runs longitudinally along the sliding plate and wherein the locking component is moveably engaged with the center slot.

19. The non-telescoping focus mechanism of claim 18 wherein the linear guiding component further comprises a first slot and a second slot that run parallel to the center slot wherein the center slot is positioned between the first slot and the second slot.

20. The non-telescoping focus mechanism of claim 19 further comprising a first locating pin and a second locating pin wherein the first locating pin and the second locating pin are attached to the second lateral side of the carriage mirror subassembly and wherein the first slot slides over the first locating pin and the second slot slides over the second locating pin to maintain the focusing lens subassembly parallel to an engraving plane.

21. The non-telescoping focus mechanism of claim 16 wherein the sliding plate is interchangeable with an alternate-length sliding plate.

* * * * *